Figure 1:
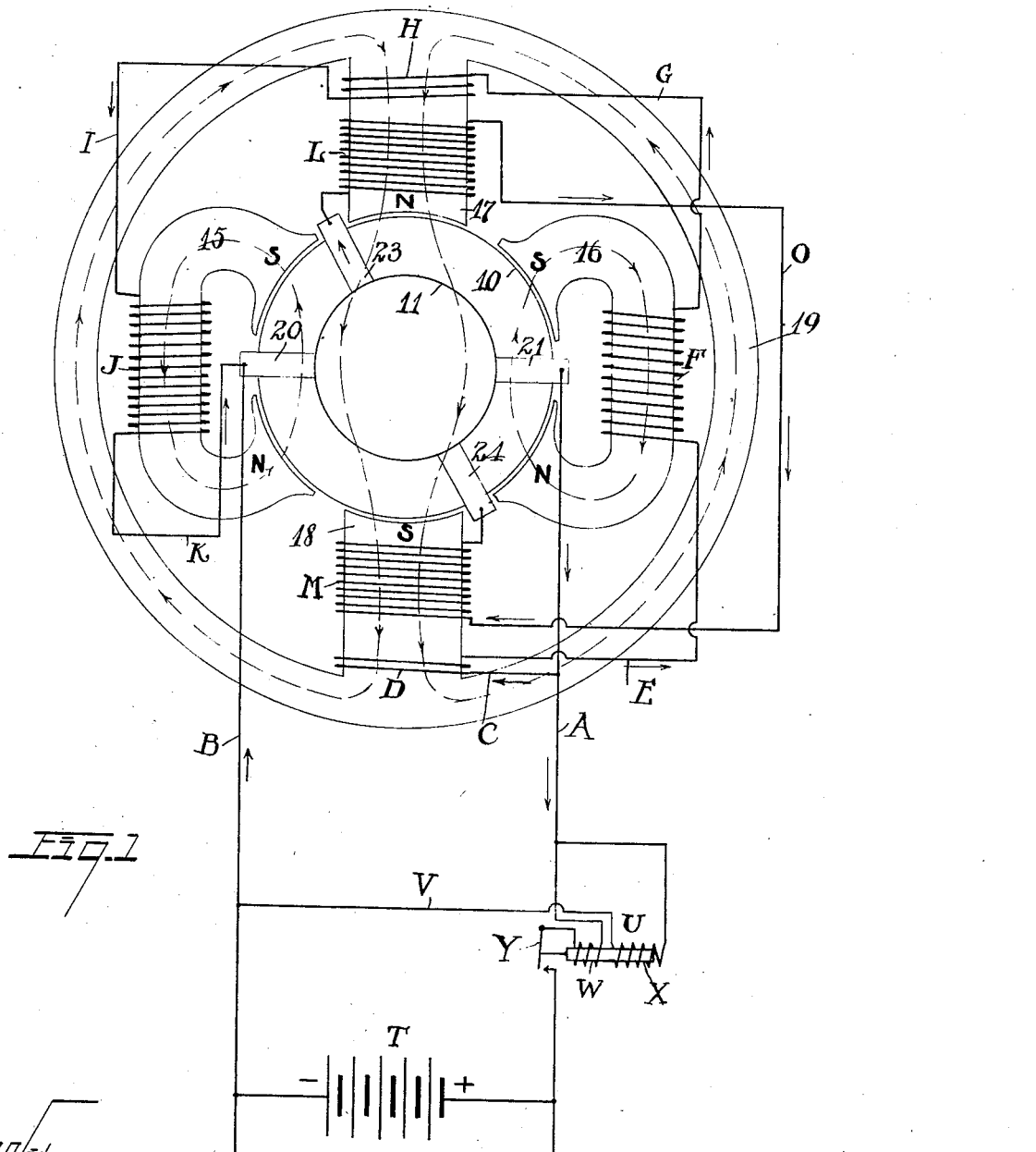

C. E. F. AHLM.
DYNAMO ELECTRIC MACHINE.
APPLICATION FILED FEB. 14, 1910.

1,132,144.

Patented Mar. 16, 1915.
2 SHEETS—SHEET 1.

Witnesses:
Oliver M. Kappler.
Hugh B. McGill

Inventor:
Charles E. F. Ahlm,
By Bates, Fouts & Hull,
Attys.

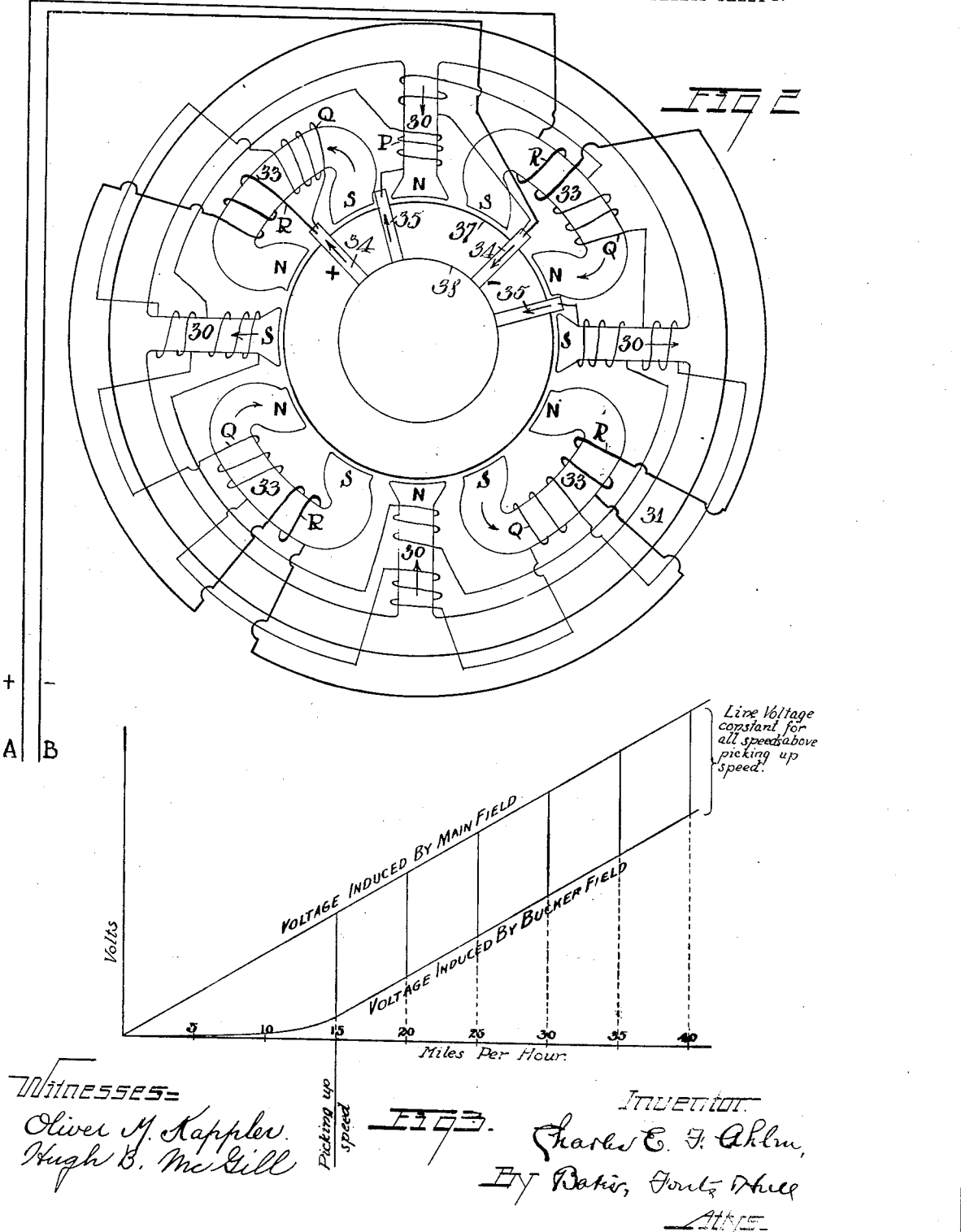

UNITED STATES PATENT OFFICE.

CHARLES E. F. AHLM, OF CLEVELAND, OHIO, ASSIGNOR TO MORRIS S. TOWSON, OF CLEVELAND, OHIO.

DYNAMO-ELECTRIC MACHINE.

1,132,144.  Specification of Letters Patent.  Patented Mar. 16, 1915.

Application filed February 14, 1910. Serial No. 543,736.

*To all whom it may concern:*

Be it known that I, CHARLES E. F. AHLM, a citizen of the United States, residing at Cleveland, in the county of Cuyahoga and State of Ohio, have invented a certain new and useful Improvement in Dynamo-Electric Machines, of which the following is a full, clear, and exact description, reference being had to the accompanying drawings.

The object of the invention is to provide a dynamo electric machine operating with a constant potential for varying speeds. If the machine is used as a generator, it will give a current of a constant potential for varying driving speeds. On the other hand, if it be used as a motor, it is adapted to rotate at varying speeds, though receiving the current of a constant potential.

My invention is well adapted to use as a generator for lighting vehicles, in connection with a battery system, where the generator is driven by the movement of the vehicle and varies in speed therewith, as, for example, where the generator is driven by a car axle. With my generator geared with a car axle and connected to charge a battery and also to light lamps in a circuit parallel with the battery, and connected with an automatic switch closing the circuit when a proper minimum train speed has been reached, I have an entirely automatic system suitable for train lighting. The lamps receive a constant potential, and they are not subjected to the undue wear and burning out resulting from high speed of armature rotation, nor to dimness of illumination when there is a decreased speed.

In carrying out this result, I have devised a dynamo electric machine having two magnetic fields, one of which is constant, and the other of which increases in strength with the speed, and in these magnetic fields I have a single armature which, as a result thereof, has a constant potential current. This will be more fully hereinafter described, as will other features contributing to the efficiency of the invention. The invention may accordingly be best summarized as comprising the coöperating elements herein explained and set out in the claims.

In the drawings, Figure 1 is a diagram illustrating my invention as applied to a two-pole machine; Fig. 2 is a diagram illustrating a four-pole machine; Fig. 3 is a diagram illustrating the constant potential which my machine as a generator gives.

I have devised a machine which embodies, in an efficient, mechanical form, the construction illustrated in the drawings hereof. The mechanical features of that machine are made the subject of a divisional application, #604,120, filed January 23, 1911, to which reference should also be made for claims covering such features.

Referring first to Fig. 1, the reference numeral 10 indicates an armature and the numeral 11, a commutator therefor. This armature is wound as for an ordinary two-pole machine, being connected to successive commutator bars, on the closed circuit principle, as is well understood.

On opposite sides of the armature, in Fig. 1, are two horse-shoe magnets designated 15 and 16 having pole faces adjacent to the armature surface, and adjacent to the armature surface between the two horse-shoe magnets, shown, are poles 17 and 18 of another magnet, these latter poles being shown as connected by the ring 19 which, in this case, forms the back of the horse-shoe. The poles 17 and 18 are, of course, of opposite polarity and the horse-shoes 15 and 16 are so placed that their poles which are adjacent to the poles 17 and 18 have a polarity opposite thereto respectively. Thus, as shown in the drawings, the pole 17, for example, in the operation of the machine, is a north pole; the upper pole of the hore-shoe 16, a south pole; the lower pole, a north pole; the pole 18, a south pole, and so on,— this polarity being indicated by the designating letters N and S on the diagram. The fields provided by the magnets 15 and 16 I denominate the main field, while the field on the poles 17 and 18, from its counteractive effect, as hereinafter described, I call the bucker field.

20 and 21 indicate two commutator brushes related to the main field, and 23 and 24 indicate commutator brushes related to the bucker field.

The winding of the main field, as shown in Fig. 1, is a shunt winding, although it may, if desired, be compounded as illustrated in Fig. 2, hereinafter to be described. The shunt winding of the main field is in series with a small coil constituting a portion of the bucker field and acting as a teaser therefor, the principal bucker field windings being independent of the main field windings, as hereinafter described.

The windings are clearly illustrated in Fig. 1. There the letters A and B indicate the main lines. Starting from the lead A, or from the commutator brush 21, the main field winding and the teaser winding may be traced as follows:—Via the line C to a few turns D (teaser coil) round the core 18, thence via the line E to a winding F (main field) on the core 16, thence via the line G to the teaser coil H on the core 17, thence via the line I to the main field-winding J, thence via the line K to the brush 20.

It will be observed that the relative direction of the main coils and teaser coils is such that if a current be flowing to give the main poles the polarity designated, the teaser coils will give the bucker poles a polarity opposite to the adjacent main poles, as also designated.

The winding of the main portion of the bucker field starts from the brush 23 through the coil L to the line O and through the coil M to the brush 24, and these coils are of high resistance, and are wound in the same direction as the teaser coils. The lines of force of the two fields are illustrated by the conventional broken lines with arrow heads thereon.

As shown in Figure 1, T represents a battery in a shunt across the main leads A and B.

U represents an automatic switch adapted to control the main line and having a compound winding; one winding X of this switch being of very high resistance and in a shunt V across the leads A and B, and the other winding W being of few turns and in series in one of the leads, as the lead A. Both windings are shown as coiling about the core in the same direction. Y indicates an armature under the influence of this compound winding W and X which is adapted, when attracted, to close the break in the lead A between the switch and battery.

The arrangement of the magnets and circuits being as described, I will describe the operation. Let us assume that the machine is a generator and that the armature 10 is connected with an axle of the car, for example, and that the switch is wound to pick up its armature when a certain current is generated, say that resulting from a train speed of fifteen miles per hour. Now, as the train starts, the armature rotates slowly and the main line is open at the switch Y so that the voltage builds up on the shunt V through the winding U of the switch. During this period, before the switch picks up, the main field and the bucker field (due to the direction given by the teaser) are operating to give currents of such direction as to cause the successive poles to have opposite signs. The actual direction of these currents depends on the residual magnetism, but their relative direction is thus fixed. The bucker field current (due to the high resistance of its winding) is so small in the early stage of rotation as to be negligible.

When the speed reaches the predetermined amount the switch picks up its armature by reason of the energization of its shunt winding, thereby throwing the battery on the line. This action is the same, irrespective of the direction of the current from the generator, but the resulting action varies with the direction of the current. Suppose first the initial current from the generator, when the switch picks up, is in the right direction for charging the battery; then the current will continue to flow in the same direction in the shunt of the switch and also in the shunt of the generator and will flow through the series winding of the switch and the battery. The switch, accordingly, will be held closed by both its shunt and series windings, and the original polarity of the generator will be maintained. In this operation, if the lamps are in circuit, the battery is either floating on the line or is being charged, according to whether the battery voltage is equal to or less than the generator voltage. If the lamps are not in circuit, the generator current is effective in charging the battery until its voltage is substantially equal to that of the generator, after which the battery floats on the line and there is practically no action, though the armature continues to rotate. Suppose, however, when the switch picks up its armature, by reason of the speed reaching a predetermined amount, that the initial current flowing from the generator through the shunt coil of the switch is in the wrong direction to charge the battery; then, under this condition the current from the generator flowing through the battery in the wrong direction for charging it flows through the series winding of the switch in the direction to assist the current in the shunt winding, thereby still holding the switch closed. Now, for the reason that the generator voltage is in the wrong direction for charging, it is in the same direction as the battery voltage, and, added to the battery current, will cause a short circuit of the armature. This short circuit, however, is only momentary for the following two reasons, namely; first, the heavy short circuit current will produce a nulling effect on the excitation of the generator field; second, the current flowing, though being in a direction opposite to the charging direction, will nevertheless flow through the generator shunt in the right direction—that is a direction for excitation which will cause the generator current to flow in the right direction for charging. These two effects combined will cause the generator current, first to become zero, at which moment the switch will open, but before it opens, the battery current acting on the generator shunt has produced a reverse polarity, so that, immediately after the switch opens it will close again, with the current flowing in the right direction, but thereafter the switch will stay closed and the current will continue in the right direction for charging.

Now, as the speed increases, the E. M. F. induced in the armature conductors by the main field rises proportional to the speed, inasmuch as this field has a constant excitation (initially, at least, due to the battery) while the E. M. F. induced in the armature conductors by the local bucker field rises in double proportion to the speed, being connected solely in series with the armature and thus having an excitation varying with the speed, (the constant excitation by the teaser being negligible) and having in addition its own voltage due to the speed. As the effects of these two fields are opposite, the main line voltage, given out by the machine, is due to their difference, which is a constant irrespective of the speed.

The action described is illustrated by the diagram, Fig. 3, wherein the ordinates represent voltages and the abscissas speeds. The E. M. F. induced in the armature by the main field increases in a straight line as does also the E. M. F. due to the bucker field so that the resultant line voltage is the difference between the two, and, always a constant irrespective of the speed above the picking-up point, thus insuring a constant potential for charging the battery as well as proper current to the lamps to illuminate them without danger of burning them out. In Fig. 3 both the main field voltage and the bucker field voltage are shown above the base line and read upwardly from it, as both these voltages are positive (though acting in opposition to each other), the resulting voltage being the difference between them. The bucker field is always in action, being in a circuit of its own, but for very low speeds the voltage induced by it is so low that its opposition to the voltage induced by the main field is negligible; but after a certain critical speed has been attained, the voltage induced by the bucker field is not only sufficient to effectively oppose the voltage induced by the main field but, like that of the main field, rises proportionately to the speed. The switch is preferably wound to pick up its armature at this critical speed. The speed at which the bucker field comes into the effective action described, may however, be varied if desired, according to conditions, by varying the winding of the switch U and the bucker field winding. The higher the speed required for the switch to pick up its armature (*i. e.* the later the "picking-up" point in Fig. 3) the greater the difference between the main field voltage and the bucker field voltage, and the greater the output. The out-put may also be increased by properly proportioning the relative strength of the different windings, causing the voltages to rise more rapidly. With the generator connected as described, when the battery is fully charged the E. M. F. of the battery and generator are equal, and no current flows in the series winding W of the switch. Hence, the switch does not open but the battery floats on the line until the speed of the generator drops so as to start the current from the battery in the direction toward the generator.

It will be seen that the brushes both for the main field and the bucker field stand in sharply defined neutral positions, insuring excellent commutation. Of course, the actual position relative to the poles may be anything depending on the armature connections to the commutator, but it is convenient to show them in the neutral position between the poles.

Fig. 2 illustrates my invention as embodied in a four-pole machine, there being, accordingly, four complete main magnets and two complete bucker magnets, that is eight main field pole pieces and four bucker field pole pieces. The bucker field pole pieces are indicated by 30, the ring 31 completing their horse-shoe connection, and the main pole pieces with their horse-shoe back are indicated by 33. The alternate polarity of the bucker and main field pole pieces are indicated, as usual, by the characters N and S. The main field brushes are shown in this figure at 34 and the bucker field brushes at 35. The armature is designated 37 and the commutator 38. It will, accordingly, be seen that the arrangement of the magnets in this four-pole construction is simply a duplication or expansion of that in the two-pole construction, and this same expansion may be increased for various multi-polar adaptations, of which this four-pole illustration is to be taken as an example. The armature winding corresponds to the number of poles of the bucker field, and hence, in this case, is wound for a four-pole machine. Fig. 2 in connection with Fig. 1 illustrates that the number of poles of the main field is in each case twice the number of poles of the bucker field. This relation of the number of mechanical poles of the two fields and the armature winding may be expressed generally by saying that for an $n$-pole bucker field, there is a $2n$-pole main field and an $n$-pole armature.

The windings in the diagram of Fig. 2 are similar to the windings of Fig. 1, except that in addition to the shunt winding on the main field, I supply also a main series winding, thus compounding these fields and steadying them. The bucker field windings are designated P, the shunt windings on the main field Q, and the series windings on the main field R. The connection of these windings will be well understood from the description heretofore given of the windings in Fig. 1, being simply an amplification of that method of winding and an addition of the series coils R interposed in one of the main lines. It will be understood, as heretofore referred to, that the two-pole embodiment may also have the series winding, the employment or non-employment of the series winding being independent of the number of poles. Summarizing, it will be seen that, whether the machine is of the two-pole or any of the various multi-pole types, I have two magnetic fields independent of each other but combining to act upon the same armature, and that this armature has a winding to conform to one of the fields only. The fields are excited from the armature, each from its own set of brushes, one field having a constant excitation and the other an excitation variable with the speed. Moreover, the bucket field, which is interposed upon the main field, has a north pole situated between south poles of the main field and a south pole between main field north poles, due to the fact that the main field has twice as many pole pieces as the bucker field and presents both a south and a north pole between adjacent north and south poles of the bucker field. The action of these two fields upon the armature is to set up in its winding two electro-motive-forces in opposite directions, whereby the resultant electro-motive force will be the difference, being a constant for all speeds above the selected speed of beginning. As the bucker field has a few turns in series with the main field, the proper polar conditions of the bucker field are automatically established to insure the bucker effect.

As heretofore referred to, my machine may be used as a variable speed motor operated by constant voltage. This is effected by making the bucker field voltage increase at a different rate from the main field voltage so that the impressed resultant voltage instead of being a constant will be variable in the ratio desired, and the speed of the motor will vary accordingly. I may conveniently cause the variations desired by a rheostat placed in the bucker field circuit.

Having thus described my invention, what I claim is:

1. In a dynamo electric machine, the combination with a single armature, of means for producing a plurality of interposed magnetic fields acting thereon, one having a constant excitation and the other a variable excitation and the two having poles of opposite sign arranged alternately, whereby a constant potential current results from the difference between the voltages given by different fields.

2. The combination, with a single armature having a single winding, of means including windings energized by current resulting from the rotation of said armature for producing two independent magnetic fields acting on said armature, one having a constant excitation independent of the speed of armature rotation and the other a variable excitation dependent on the speed of armature rotation.

3. In a dynamo electric machine, the combination of a single armature with a single winding, and means supplied from said armature for producing two magnetic fields therefor, one having a constant excitation in either direction dependent upon the direction of the rotation of said armature and the other an excitation dependent upon such armature rotation and increasing in strength with the speed.

4. The combination in a dynamo electric machine of a single armature and two electro-magnetic field systems independent of each other but combining to act upon the same armature, one of said systems having twice as many polar projections as the other, the field system with the greater number of polar projections having a constant excitation and the other field being in a local circuit and having an excitation increasing with the speed.

5. The combination in a dynamo electric machine of a single armature, and means for producing two electro-magnetic fields having windings independently connected with said armature and combining to present poles at all times of successively alternate signs to the same armature.

6. The combination in a dynamo electric machine of a single armature, and means for producing two electro-magnetic fields having windings independently connected to the same armature, one of said fields having both a north and a south pole on the same side of the armature and between adjacent north and south poles of the other field.

7. In a dynamo electric machine, the combination, with the armature, of means for producing a main electro-magnetic field and a counteractive electro-magnetic field both acting therein and excited thereby through independent circuits and together always presenting magnetic poles of successively reversed polarity.

8. In a dynamo electric machine, the combination, with the armature, of a main field system and a counteractive field system both acting thereon, the main field having a plurality of two-pole magnets, the successive poles of the two field systems being at all times of opposite polarity.

9. In a dynamo electric machine, the combination, with an armature, of a main field system and a counteractive field system both acting therein, each system being excited through independent circuits from the same armature and the main field always presenting magnetic poles of alternate polarity to those of the counteractive field which are adjacent thereto.

10. In a dynamo electric machine, the combination, with an armature, of main field magnets, and means for producing a counteractive field coöperating with the same armature and having a magnetic south pole interposed between north poles of the main field and a magnetic north pole interposed between south poles of the main field.

11. In a dynamo electric machine, the combination, with the armature, of a field producer having its own local circuit, and a plurality of field magnets each having two magnetic poles inserted between the magnetic poles of said field producer, said field producer having its poles always of opposite sign to the adjacent poles of said field magnets.

12. The combination, in a dynamo electric machine, of a single armature, and two electro magnetic field systems independently excited by said armature, one of said fields having twice as many magnetic poles as the other, the armature being wound to conform to the number of poles of one of the two magnetic fields.

13. In a dynamo electric machine, the combination, with a single armature, of means for producing a plurality of interposed and independent electro-magnetic fields acting thereon, the armature being wound to correspond to the number of holes of one of the fields, and commutator brushes in sets corresponding to the different fields.

14. The combination of two field magnet systems independent of each other, a single armature common to both systems, and having a single winding independent brushes connected to the windings of the respective field magnets of said systems, said elements constituting means adapted to excite one field constantly and in either direction and the other variably.

15. In a dynamo electric machine, the combination of a multi-polar main field system, a counteractive field system, a single armature with a single winding common to both systems, and two independent sets of commutator brushes, one connected with the main field system and the other connected with the counteractive field system.

16. In a dynamo electric machine, the combination, with a main field system, of a counteractive field system having a north polar projection between adjacent south polar projections of the main field, and a south polar projection between adjacent north polar projections of the main system, and independent brushes for the two field systems.

17. In a dynamo electric machine, the combination of a field magnet having at least a north and a south polar projection and windings thereon in a local circuit, commutator brushes constituting terminals for said local circuit, and a plurality of main field polar projections comprising a north and south pole interposed between south and north poles of the field first mentioned.

18. In a dynamo electric machine, the combination, with the armature, a commutator and two sets of commutator brushes, of means for producing a field having at least a north and a south magnetic pole and windings thereon in a local circuit terminating in one of the sets of commutator brushes, means for producing a plurality of main field magnetic poles comprising a north and a south pole interposed between south and north poles of the first-mentioned field producer, and windings on the main field producer in a shunt across the other set of brushes.

19. In a dynamo electric machine, the combination, with two or more main field magnets, of one or more counteractive field magnets having a north pole piece between adjacent south pole pieces of the main field magnets and a south pole piece between adjacent north pole pieces of the main field magnets, a single armature for both the main and counteractive field magnets, and two sets of commutator brushes, one connected with the counteractive field magnet and the other with the main field magnets.

20. In a dynamo electric machine, the combination, with an armature, of main field magnets, a counteractive field magnet coöperating with the same armature and having a south pole piece interposed between north pole pieces of the main field magnet and a north pole piece interposed between main field magnet south pole pieces, two sets of commutator brushes one connected with the main field and one with the counteractice field, a local winding for the counteractive field terminating in its brushes, and a winding for the main field adapted to be in electric connection with the main line.

21. In a dynamo electric machine, the combination, with an armature, of a field electro-magnet having a north and a south pole piece, a plurality of independent field electro-magnets each comprising a north and a south pole piece connected together, both of these connected pole pieces of each independent magnet being interposed in the space between north and south pole pieces of the magnet first mentioned, two independent sets of commutator brushes, a winding on the magnet first mentioned in a continuous local circuit from commutator brush to commutator brush of one set, and a winding on the other magnets adapted to be in electric connection with the other set.

22. In a dynamo electric machine, the combination, with a main field system, of a counteractive field system having a north magnetic pole between adjacent south poles of the main fields and a south magnetic pole between adjacent north poles of the main field, a single armature for both the main and counteractive fields, and two sets of commutator brushes, one connected with the counteractive field and the other connected with the main field, said commutator brushes being located at points corresponding to neutral zones between the various poles.

23. The combination, with an armature, of two magnetic field windings independent of each other having independent excitations from the same armature and combining to act on the same armature, and a teaser winding connected in circuit with the winding of one of the fields and independent of the other for directing the magnetic flux in such field.

24. In a dynamo electric machine, the combination, with an armature, of windings for producing a main field and a counteractive field both acting thereon, said counteractive field having a teaser winding in series with the main field winding and independent of the counteractive field producer.

25. In a dynamo electric machine, the combination, with a plurality of main field pole pieces each including a north and a south pole piece, of a counteractive field magnet having at least a north pole piece between main field south pole pieces and a south pole piece between main field north pole pieces, independent field windings for the main and counteractive field pole pieces, and means for determining the direction of magnetic flux in the counteractive field.

26. The combination, with an armature, of a main field system, a counteractive field system having a north magnetic pole interposed between adjacent south magnetic poles of the main field system, a south magnetic pole interposed between adjacent north magnetic poles of the main field system, and a teaser winding for the counteractive field in the circuit of the main field system to determine the direction of excitation of the counteraction field.

27. The combination, with an armature, of a main electro-magnetic field system, a counteractive electro-magnetic field system having a north magnetic pole interposed between adjacent south magnetic poles of the main field and a south magnetic pole interposed between adjacent north magnetic poles of the main field, and a teaser winding for the counteractive field, said teaser winding being in series with a winding of the main field system and independent of the winding of the counteractive field system.

28. In a dynamo electric machine, the combination, with a plurality of field magnets each having a north and a south magnetic pole, additional field magnets having at least a north magnetic pole between south magnetic poles and a south magnetic pole between north magnetic poles of the magnets first mentioned, and a teaser winding on one of the field magnets last mentioned in a circuit independent of that magnet for determining the direction of magnetic flux therein.

29. The combination, with an armature, of a plurality of horse-shoe magnets having windings, independent pole pieces interposed between such magnets and having windings, a continuous ring magnetically connecting said independent pole pieces, and two independent sets of commutator brushes, and circuits connecting the brushes with the windings of said magnets and pole pieces respectively.

30. The combination, with an armature, of pole pieces arranged thereabout, a continuous ring of magnetic material carrying and connecting said pole pieces, a plurality of horse-shoe magnets interposed between said pole pieces and carried substantially independently of the magnetic flux in said ring, and windings in separate circuits for said pole pieces and horse-shoe magnets respectively.

31. In a dynamo electric machine, the combination with a revolving member having an $n$-pole winding, main brushes and an auxiliary brush displaced by about $120/n$ degrees from a main brush, of a stationary member carrying coils adapted to produce a $3n$ pole field, said coils being connected in a plurality of sets and each set connected with a different set of brushes.

32. In a dynamo electric machine, the combination with a stationary member having $3n$ mechanical poles provided with coils, of a revolving member having an $n$-pole winding, main brushes and an auxiliary brush displaced by sixty electrical degrees from one of the main brushes, and means connecting said coils to the brushes in sets.

33. In a dynamo electric machine, the combination with a stationary member having $3n$ mechanical poles provided with coils, of a revolving member having an $n$-pole winding, main brushes and an auxiliary brush displaced by about $120/n$ degrees from one of the main brushes, and means connecting said coils in a plurality of sets, each set being connected with a different set of brushes.

34. In a dynamo electric machine, the combination with a stationary member having $3n$ mechanical poles provided with coils, of a revolving member having an $n$-pole winding, main brushes and an auxiliary brush displaced by about 120/n degrees from one of the main brushes, said coils being connected in a plurality of sets and each set connected with a set of said brushes, and means for producing an auxiliary magneto motive force on certain of the mechanical poles.

35. In a dynamo electric machine, the combination with a stationary member having $3n$ mechanical poles, of a revolving member having an $n$-pole winding, main brushes and auxiliary brushes displaced sixty electrical degrees from the main brushes, each brush being located between adjacent mechanical poles, main exciting coils on the poles adjacent to the main brushes and connected in series between two of said brushes.

36. In a dynamo electric machine, the combination with a stationary member having $3n$ mechanical poles, of a revolving member having an $n$-pole winding, main brushes and auxiliary brushes displaced sixty electrical degrees from the main brushes, each brush being located between adjacent mechanical poles, main exciting coils on the poles adjacent to the main brushes and connected in series between two of said brushes, and auxiliary coils on the remaining mechanical poles connected in series between the other two brushes.

37. In a dynamo electric machine, the combination with a stationary member having $3n$ mechanical poles, of a revolving member having an $n$-pole winding, main brushes and auxiliary brushes displaced sixty electrical degrees from the main brushes, each brush being located between adjacent mechanical poles, main exciting coils for certain of said mechanical poles, said coils being connected in series between two of said brushes, and auxiliary coils located on poles displaced ninety electrical degrees from the main brushes.

38. In a dynamo electric machine, the combination with a stationary member having $3n$ mechanical poles, of a revolving member having an $n$-pole winding main brushes and auxiliary brushes displaced sixty electrical degrees from the main brushes, each brush being located between adjacent mechanical poles, main exciting coils for said mechanical poles, said coils being connected in a plurality of sets and each set connected with a different set of brushes.

39. In a dynamo electric machine, the combination with a stationary member having $3n$ mechanical poles, of a revolving member having an $n$-pole winding, main brushes and auxiliary brushes displaced sixty electrical degrees from the main brushes, each brush being located between adjacent mechanical poles, main exciting coils on the poles adjacent to the main brushes, and counteracting coils on the other poles.

40. In a dynamo electric machine, the combination with a stationary member having $3n$ mechanical poles, of a revolving member having an $n$-pole winding, main brushes and auxiliary brushes displaced sixty electrical degrees from the main brushes, each brush being located between adjacent mechanical poles, main exciting coils on the poles adjacent to the main brushes and connected in series between two of said brushes, and counteracting coils on the remaining mechanical poles, said last mentioned coils being connected with the other two brushes.

41. In a dynamo electric machine, the combination with a stationary member having $3n$ mechanical poles, of a revolving member having an $n$-pole winding, main brushes and auxiliary brushes displaced sixty electrical degrees from the main brushes, each brush being located between adjacent mechanical poles, main exciting coils on the poles adjacent to the main brushes and connected in series between two of said brushes, and coils on the remaining mechanical poles connected to oppose the voltage developed by the armature and main field.

42. In a dynamo electric machine, the combination with a stationary member having $3n$ mechanical poles provided with coils, of a revolving member having an $n$-pole winding, main brushes and auxiliary brushes displaced by sixty electrical degrees from the main brushes, and means connecting certain of the coils on the stationary member in series with two of said brushes, the other coils being connected with the other brushes.

43. In a dynamo electric machine, the combination with a stationary member having $3n$ mechanical poles provided with coils, of a revolving member having an $n$-pole winding, main brushes and auxiliary brushes, each of said brushes being located between adjacent poles, said coils being connected in a plurality of sets and each set connected with a different set of brushes.

44. In a dynamo electric machine, the combination with a stationary member having $3n$ mechanical poles and windings on certain of said poles, of a revolving member having main brushes and auxiliary brushes each brush being located in an inter-polar space, and an exciting circuit comprising two brushes and windings on poles adjacent to a main brush.

45. In a dynamo electric machine, the combination with a stationary member having $3n$ mechanical poles and windings on certain of said poles, of a revolving member having main brushes and auxiliary brushes and an exciting circuit comprising two brushes and windings on poles adjacent to a main brush, and another circuit comprising the other two brushes, and a winding on the stationary member, said winding being displaced by 90 electrical degrees from said main brushes.

46. In a dynamo electric machine, the combination with a field structure comprising $3n$ mechanical poles and windings thereon, of an armature having an $n$-pole winding, main brushes and auxiliary brushes, each brush being located between adjacent mechanical poles, and an exciting circuit comprising two brushes and windings on poles adjacent to a main brush, and another circuit comprising the other brushes.

47. The combination in a dynamo electric machine, of an armature and a main magnetic field system and a counteracting magnetic field system, the polar projections of the main system being a multiple in number of those in the counteracting system, a pair of main brushes, a pair of auxiliary brushes, and two sets of field windings, each set being connected with a different two of said brushes.

48. In a dynamo electric machine, the combination with a field system having $3n$ mechanical poles provided with coils, of an armature having an $n$-pole winding, two main brushes and two auxiliary brushes, and means connecting said coils in a plurality of sets, each set being connected with a different two of said brushes.

49. The combination, with an armature, of a plurality of horse-shoe magnets having windings, independent pole pieces spaced between such magnets and having windings, a magnetic connector between said pole pieces, two sets of commutator brushes, and circuits connecting the brushes with the windings of said magnets and pole pieces.

In testimony whereof, I hereunto affix my signature in the presence of two witnesses.

CHARLES E. F. AHLM.

Witnesses:
　ALBERT H. BAKER,
　A. J. HUDSON.